United States Patent
Nishikawa et al.

(10) Patent No.: US 10,303,317 B2
(45) Date of Patent: May 28, 2019

(54) TOUCH SENSOR PROVIDED WITH A CIRCULARLY POLARIZING PLATE, AND IMAGE DISPLAY DEVICE

(71) Applicant: Nissha Co., Ltd., Kyoto-shi, Kyoto (JP)

(72) Inventors: Kazuhiro Nishikawa, Kyoto (JP); Ryomei Omote, Kyoto (JP); Takao Hashimoto, Kyoto (JP); Takeshi Nishimura, Kyoto (JP)

(73) Assignee: NISSHA CO., LTD., Kyoto-shi, Kyoto (JP)

( * ) Notice: Subject to any disclaimer, the term of this patent is extended or adjusted under 35 U.S.C. 154(b) by 0 days.

(21) Appl. No.: 15/575,190

(22) PCT Filed: Apr. 20, 2016

(86) PCT No.: PCT/JP2016/062451
§ 371 (c)(1),
(2) Date: Nov. 17, 2017

(87) PCT Pub. No.: WO2016/203838
PCT Pub. Date: Dec. 22, 2016

(65) Prior Publication Data
US 2018/0150155 A1   May 31, 2018

(30) Foreign Application Priority Data

Jun. 19, 2015   (JP) ................. 2015-124245

(51) Int. Cl.
*G06F 3/044*   (2006.01)
*G06F 3/041*   (2006.01)
*G02B 5/30*   (2006.01)

(52) U.S. Cl.
CPC .......... *G06F 3/044* (2013.01); *G02B 5/3025* (2013.01); *G06F 3/0412* (2013.01);
(Continued)

(58) Field of Classification Search
CPC ................. G06F 3/0412; G06F 3/044; G06F 2203/04103
See application file for complete search history.

(56) References Cited

U.S. PATENT DOCUMENTS

| | | | |
|---|---|---|---|
| 2014/0035599 A1* | 2/2014 | Shimata | G06F 3/044 324/658 |
| 2015/0000960 A1* | 1/2015 | Gaynor | B82Y 10/00 174/251 |

(Continued)

FOREIGN PATENT DOCUMENTS

| | | |
|---|---|---|
| CN | 104350447 A | 2/2015 |
| CN | 204314857 U | 5/2015 |

(Continued)

OTHER PUBLICATIONS

International Search Report dated Jun. 14, 2016 for corresponding foreign Application No. PCT/JP2016/062451, 2 pp.

(Continued)

*Primary Examiner* — David Tung
(74) *Attorney, Agent, or Firm* — United IP Counselors, LLC

(57) ABSTRACT

A touch sensor with a circularly polarizing plate includes an electrostatic capacitance type touch sensor. A circularly polarizing plate is arranged on a visible side of the electrostatic capacitance type touch sensor. The sensor includes a transparent substrate and a plurality of first electrodes individually formed in a strip shape on the transparent substrate. The sensor additionally includes a plurality of second electrodes formed on a surface of the transparent substrate opposite to a surface on which the first electrodes are formed. The second electrodes have a strip shape in a manner of intersecting with the first electrodes. The first electrodes are made of a metal mesh. The second electrodes are made of a plurality of conductive nanowires, existing in (Continued)

a connecting state respectively so as to be conductively connected, and a binder resin holding the plurality of conductive nanowires on the second transparent substrate.

21 Claims, 9 Drawing Sheets

(52) U.S. Cl.
CPC .. *G06F 3/0418* (2013.01); *G06F 2203/04102* (2013.01); *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 2015/0138452 A1* | 5/2015 | Petcavich | G06F 3/0412 349/12 |
| 2015/0145824 A1* | 5/2015 | Park | G06F 3/044 345/174 |
| 2015/0193046 A1 | 7/2015 | Tokuno et al. | |
| 2016/0011351 A1 | 1/2016 | Tomohisa et al. | |

FOREIGN PATENT DOCUMENTS

| | | |
|---|---|---|
| CN | 105009190 A | 10/2015 |
| EP | 2876532 A2 | 5/2015 |
| JP | H02120804 A | 5/1990 |
| JP | 2000137116 A | 5/2000 |
| JP | 2002014234 A | 1/2002 |
| JP | 2002048919 A | 2/2002 |
| JP | 2003315538 A | 11/2003 |
| JP | 2013246734 A | 12/2013 |
| JP | 2013246735 A | 12/2013 |
| JP | 2014197183 A | 10/2014 |
| JP | 2015103254 A | 6/2015 |
| JP | 2016099767 A | 5/2016 |
| KR | 1020150059331 A | 6/2015 |
| KR | 1020150115005 A | 10/2015 |
| TW | 201439613 A | 10/2014 |
| TW | 201535218 A | 9/2015 |
| WO | 0026705 A1 | 5/2000 |
| WO | 2014136820 A1 | 9/2014 |

OTHER PUBLICATIONS

International Written Opinion dated Jun. 14, 2016 for corresponding foreign Application No. PCT/JP2016/062451, 2 pp.

* cited by examiner

TOUCH SENSOR PROVIDED WITH A CIRCULARLY POLARIZING PLATE, AND IMAGE DISPLAY DEVICE

CROSS-REFERENCES TO RELATED APPLICATIONS

This application is the U.S. National Phase of PCT International Application No. PCT/JP2016/062451 filed on Apr. 20, 2016. That application claims priority to Japanese Patent Application No. 2015-124245, filed on Jun. 19, 2015. The contents of both applications are herein incorporated by reference in their entirety.

BACKGROUND

Technical Field

The present invention relates to a touch sensor provided with a circularly polarizing plate, and an image display device using the same.

Background Art

Conventionally, in an image display device having a touch sensor, there were many touch sensors which were provided with an electrode pattern formed by a metal oxide layer such as an indium-tin complex oxide (ITO) on a transparent resin film. However, the touch sensor provided with the metal oxide layer easily lost its conductivity due to the bending, and therefore, there was a problem that it was difficult to use a touch sensor which required bendability such as a flexible display, etc.

On the other hand, as a touch sensor having high bendability, it is well known that a touch sensor is provided with an electrode pattern formed by a transparent conductive layer of a metal nanowire or a metal mesh. However, for the touch sensor, there is a problem that external-light reflects and scatters by the metal nanowire, etc. When such a touch sensor is used in the image display device, there are problems that the electrode pattern of the metal nanowire, etc. is visible, and also, it reduces the contrast, so that the display characteristics are deteriorated.

To solve the aforementioned problems, Patent Application Publication JP-A-2014-197183 discloses an image display device provided with a circularly polarizing plate, a touch sensor (transparent conductivity film), and a display panel in this order from a visible side. The touch sensor (transparent conductivity film) has a transparent conductive layer arranged in at least one side of the transparent substrate, and the transparent conductive layer includes the metal nanowire or the metal mesh.

According to the image display device of Patent Application Publication JP-A-2014-197183, since the circularly polarizing plate is arranged on the front surface of the touch sensor (transparent conductivity film), the projection of the reflecting light generated by reflecting the external-light on the touch sensor (transparent conductivity film) can be suppressed. Since the projection of the reflecting light is suppressed, even when the transparent conductive layer including the metal nanowire or the metal mesh is used, so-called visible patterns, in which the electrode patterns (that is, patterns of metal nanowire or metal mesh) are visibly recognized, hardly occur, and an image display device having high contrast can be obtained.

BRIEF SUMMARY

However, even though the touch sensor provided with a circularly polarizing plate, in which the circularly polarizing plate is arranged on the front surface of the touch sensor as described in Patent Application Publication JP-A-2014-197183, is used, when two layers of electrodes having high bendability are provided, there is a problem that the visibility becomes insufficient.

That is, when the two transparent conductive layers having the electrode patterns formed by the metal nanowires are provided, the intensive scattering reflection of the external light occurring by the network structure, in which the metal nanowires are formed in contact, demonstrates synergistic effect by providing the two layers having the electrode patterns in a lamination arrangement, and therefore, the projection of partial visible light cannot be suppressed by only the circularly polarizing plate. As a result, the patterns are visible with yellowish color.

On the other hand, when two transparent conductive layers having electrode patterns formed by the metal mesh are provided, the scattering reflection itself is not intense in comparison with the metal nanowire, but haze becomes large by providing the two layers having the electrode patterns in the lamination arrangement.

The present invention was made to solve the aforementioned problems. An object of the present invention is to provide a touch sensor provided with a circularly polarizing plate, which has an excellent suppression of visible patterns and small haze even though two layers of electrodes having high bendability are provided, and an image display device using the same.

Technical Solution

Hereinafter, the means to solve the aforementioned problems will be described.

According to the 1st aspect of the present invention, a touch sensor with a circularly polarizing plate includes an electrostatic capacitance type touch sensor, and a circularly polarizing plate arranged on a visible side of the electrostatic capacitance type touch sensor. The electrostatic capacitance type touch sensor includes a transparent substrate; a plurality of first electrodes individually formed in a strip shape on the transparent substrate; and a plurality of second electrodes formed on a surface of the transparent substrate opposite to a surface on which the first electrodes are formed, the second electrodes having a strip shape in a manner of intersecting with the first electrodes. Further, the first electrodes are made of a metal mesh, and the second electrodes are made of a plurality of conductive nanowires, existing in a connecting state respectively so as to be conductively connected, and a binder resin holding the plurality of conductive nanowires on the transparent substrate.

Further, according to the 2nd aspect of the present invention, a touch sensor with a circularly polarizing plate includes an electrostatic capacitance type touch sensor and a circularly polarizing plate arranged on a visible side of the electrostatic capacitance type touch sensor. The electrostatic capacitance type touch sensor includes a first conductive sheet including a first transparent substrate; and a plurality of first electrodes individually formed in a strip shape on the first transparent substrate; a second conductive sheet including a second transparent substrate arranged in a manner of facing the first transparent substrate, and a plurality of second electrodes formed in a strip shape in a manner of intersecting with the first electrodes on the second transparent substrate; and an adhesive layer adhering the first conductive sheet and the second conductive sheet with each other. Further, the first electrode is made of the metal mesh, and the second electrodes are made of a plurality of conductive nanowires, which exists in a connecting state respectively so as to be conductively connected, and a binder resin to hold the plurality of conductive nanowires on the second transparent substrate.

Further, according to 3rd aspect of the present invention, a touch sensor with a circularly polarizing plate includes an electrostatic capacitance type touch sensor and a circularly polarizing plate arranged on a visible side of the electrostatic capacitance type touch sensor. The electrostatic capacitance type touch sensor includes a transparent substrate; a plurality of first electrodes individually formed in a strip shape on the transparent substrate; a plurality of second electrodes formed in a strip shape in a manner of intersecting with the first electrodes on the transparent substrate; and an intermediate layer disposed between the first electrodes and the second electrodes. Further, the first electrodes are made of a metal mesh, and the second electrodes are made of a plurality of conductive nanowires, which exists in a connecting state respectively so as to be conductively connected, and a binder resin to hold the plurality of conductive nanowires on the transparent substrate.

Further, according to the 4th aspect of the present invention, in the touch sensor provided with a circularly polarizing plate according to any of the 1st aspect to the 3rd aspect, the first electrodes, which are made of the metal mesh, are positioned closer to a circularly polarizing plate side than the second electrodes.

Further, according to the 5th aspect of the present invention, in the touch sensor provided with a circularly polarizing plate according to the 1st aspect, the first electrodes, which are made of the metal mesh, are positioned closer to the circularly polarizing plate side than the second electrodes, and have a concave-shaped touch operation surface of which all layers are curved.

Further, according to the 6th aspect of the present invention, in the touch sensor provided with a circularly polarizing plate according to the 1st aspect, the first electrodes, which are made of the metal mesh, are positioned closer to the circularly polarizing plate side than the second electrodes, and have a convex-shaped touch operation surface of which all layers are curved.

Further, according to the 7th aspect of the present invention, in the touch sensor provided with a circularly polarizing plate according to any of the 1st aspect to the 6th aspect, the metal mesh is made of copper.

Further, according to the 8th aspect of the present invention, in the touch sensor provided with a circularly polarizing plate according to any of the 1st aspect to the 7th aspect, the conductive nanowires is made of silver.

Further, according to the 9th aspect of the present invention, in the touch sensor provided with a circularly polarizing plate according to any of the 1st aspect to the 8th aspect, the touch sensor includes an insulation part continuously formed with the second electrodes. The insulation part is made of only the binder resin, which is provided in the second electrodes including the conductive nanowires.

Further, according to the 10th aspect of the present invention, in the touch sensor provided with a circularly polarizing plate according to any of the 1st aspect to the 8th aspect, the touch sensor includes lead wirings, which are made of the same metal as the metal mesh and are connected with the first electrodes and the second electrodes. The conductive nanowires of the second electrodes exist only in a surface layer of the binder resin, and the surface layer overlaps with and directly connects to one end of the lead wirings.

Further, according to the 11th aspect of the present invention, an image display device includes the touch sensor provided with a circularly polarizing plate according to any of the 1st aspect to the 10th aspect which is provided on a front surface of a display panel.

The present invention is a touch sensor provided with a circularly polarizing plate, the circularly polarizing plate being arranged in a visible side of an electrostatic capacitance type touch sensor. Different materials of electrodes are combined, such that the first electrodes of the touch sensor are formed by a metal mesh, and the second electrodes include conductive nanowires.

Accordingly, it is possible to obtain a touch sensor provided with the circularly polarizing palate having an excellent suppression of visible patterns and small haze in comparison with the touch sensor provided with a circularly polarizing plate described in Patent Application Publication JP-A-2014-197183, and obtain an image display device using the same.

DETAILED DESCRIPTION OF EMBODIMENTS

Hereinafter, the embodiments according to the present invention will be described in detail with reference to the drawings. Further, the scope of the present invention is not limited to the dimensions, materials, shapes, relative arrangements, and so on of the components described in the embodiments alone in particular unless specifically described. It is only the examples for explanation.

Embodiment 1

1. Structure of Touch Sensor

Figure 1:
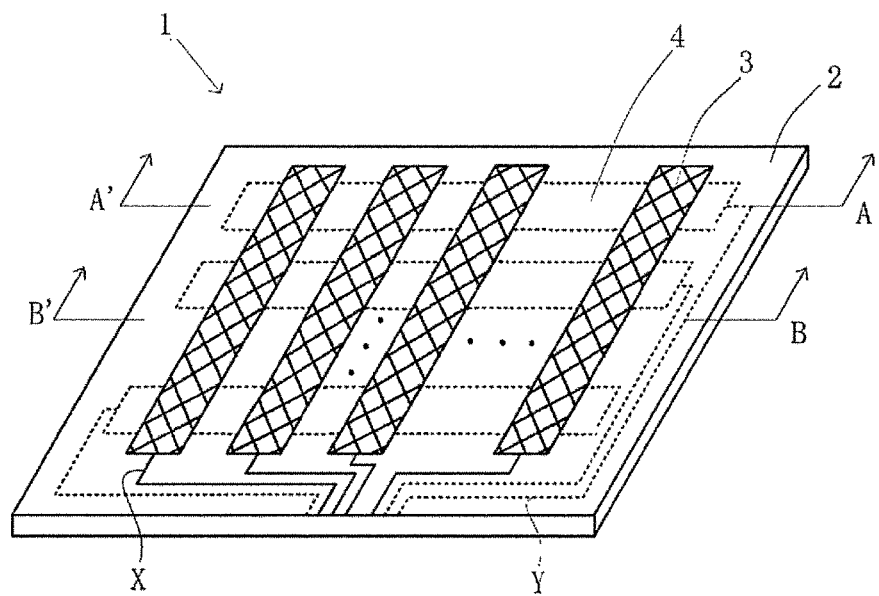
FIG. 1 is a perspective view showing a touch sensor in a touch sensor provided with a circularly polarizing plate according to embodiment 1.
Figure 2:
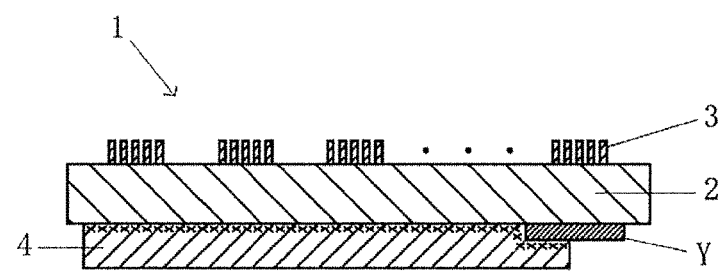
FIG. 2 is an A-A' line cross-sectional enlarged view of the touch sensor shown in FIG. 1.
Figure 3:
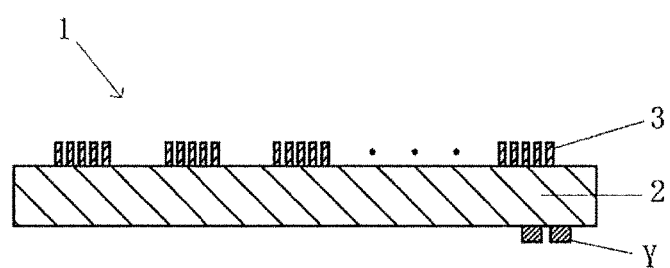
FIG. 3 is a B-B' line cross-sectional enlarged view of the touch sensor shown in FIG. 1.

FIG. 1 is a perspective view showing a touch sensor 1 in a touch sensor 20 (one with a circularly polarizing plate) according to embodiment 1. In FIG. 1, the dotted line part shows a structure in a back side of the transparent substrate 1. FIG. 2 is an A-A' line cross-sectional enlarged view of the touch sensor 1 of FIG. 1. FIG. 3 is a B-B' line cross-sectional enlarged view of the touch sensor 1 of FIG. 1. Further, the A-A' cross-section is the cross-sectional view when the touch sensor 1 is cut in the second electrode 4. The B-B' cross-section is the cross-sectional view when the touch sensor 1 is cut in a space between the second electrodes 4. The dots [ . . . ] drawn in each drawing indicate an abbreviation of a part of the electrode.

As shown in FIG. 1, in the touch sensor 20 (one with a circularly polarizing plate), the touch sensor 1 includes a transparent substrate 2, a plurality of first electrodes 3 independently formed in a strip-shape on the transparent substrate 2, first lead wirings X electrically connected to an external part from the first electrodes 3, a plurality of second electrodes 4 formed in a strip-shape in a manner of intersecting with the first electrodes 3 on the opposite surface from the surface of the transparent substrate 2 on which the first electrodes 3 are formed, and second lead wirings Y electrically connected to the external part from the second electrodes 4.

Hereinafter, the respective members which provide the touch sensor 1 will be described.

<Transparent Substrate>

As a material of the transparent substrate 2, it may be polyethylene terephthalate (PET) film, polycarbonate (PC) film, cycloolefin polymer (COP) film, polyvinyl chloride (PVC) film, cycloolefin copolymer (COC) film, etc. Specifically, the COP film is preferable because it has not only excellent optical isotropy but also excellent dimensional stability, and accordingly, it has excellent machining accuracy. The thickness of the transparent substrate can be appropriately set in a range between 5 μm to 800 μm. When the thickness is less than 5 μm, it lacks the strength as a layer, and when peeling, it is easily broken, so that it is difficult to handle. When the thickness is more than 800 μm, the rigidity is too high, so that it is difficult to perform machining and the flexibility cannot be obtained. The transparent substrate 2 may be made of using a flexible glass substrate, etc.

<First Electrode and Second Electrode>

In FIG. 1, the first electrodes and the second electrodes are respectively formed in a strip-shape and made of multiple electrodes, but the shape of the electrodes is not limited to the strip-shape. For example, it may be made of a plurality of rhombus-shaped electrodes which are connected in a diagonal direction as the first electrodes, and it may be made of a plurality of rhombus-shaped electrodes which are connected in a diagonal direction as the second electrodes. In this case, the rhombus-shaped electrode configuring the first electrode and the rhombus-shaped electrode configuring the second electrode may be arranged in a manner of complementing a non-forming part of the rhombus-shaped electrodes to each other when it is viewed from the direction perpendicular to the surface. With this, the first electrodes and the second electrodes are arranged in a manner that they are almost no overlapping, and therefore, it is possible that the detection sensitivities in a horizontal axis direction and a vertical axis direction are not affected to each other. Further, in FIG. 1, a plurality of the first electrodes and the second electrodes are provided, but it is not limited to this, so that any number can be provided.

Conventionally, any materials can be used for the materials of the first electrode and the second electrode as long as the materials having conductivity. However, in the present invention, as a combination of materials to provide the first electrode and the second electrode, the first electrode made of a metal mesh, and the second electrode is made of a photocurable resin binder and conductive nanowires.

In the metal mesh, fine wires made of a metal having low electric resistance are formed in a latticed pattern. Examples of the metal providing the metal mesh include copper, aluminum, gold, silver, titanium, palladium, chromium, and a combination of thereof.

Examples of the conductive nanowire include a metal nanowire sequentially drawn by acting applied voltage or electric current from a tip end portion of a probe on a surface of a precursor carrying a metal ion of gold, silver, platinum, copper, palladium, etc., and a peptide nanofiber in which gold particles are added to a nanofiber formed by peptide or its derivative in a self-organizing manner, etc. Further, examples of the photocurable resin binder include urethane acrylate, cyanoacrylate, etc.

The diameter of the conductive nanowire is preferably 1 nm to 50 nm, more preferably, 2 nm to 20 nm, and further preferably, 3 nm to 10 nm. Further, the length of the conductive nanowire is preferably 1 μm to 100 μm, more preferably, 2 μm to 50 μm, and further preferably, 3 μm to 10 μm.

Among the aforementioned materials, as a further preferable combination, it is the case that a copper mesh as a metal mesh, a silver nanowire as a conductive nanowire, and urethane acrylate as a photocurable resin binder are used.

With such a configuration, the first electrodes 3 made of the metal mesh have a smaller scattering degree of external-light than the second electrodes 4 including the conductive nanowires, and a synergistic effect of the scattering with the second electrodes 4 is also small. As a result, the scattering reflected to the circularly polarizing plate side can be suppressed in comparison with the case that the first electrodes 3 and the second electrodes 4 include the conductive nanowires. Therefore, the sufficient effect of the suppression of visible patterns can be obtained by the function of the circularly polarizing plate.

On the other hand, the haze of the second electrodes 4 including the conductive nanowires is smaller than the haze of the first electrodes 3 made of the metal mesh. As a result, the haze can be smaller in comparison with the case that the first electrodes 3 and the second electrodes 4 are made of the metal mesh.

The thickness of the first electrodes and the second electrodes can be appropriately set in a range of several tens of nanometers to several hundreds of nanometers. When the thickness is thinner than several tens of nanometers, it lacks the strength. When the thickness is thicker than several hundreds of nanometers, the flexibility is not sufficient.

<PAS Layer>

Figure 21:
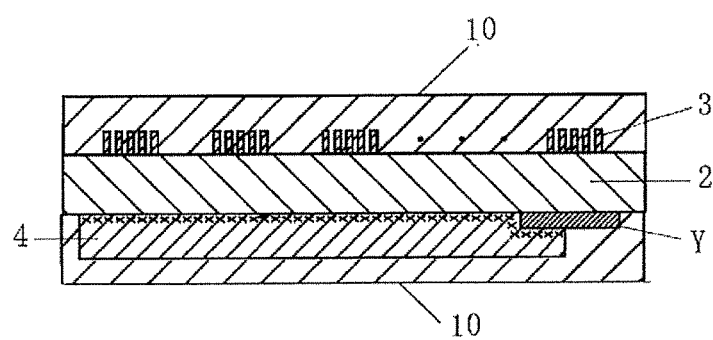
FIG. 21 is a cross-sectional enlarged view showing an example in which a PAS layer is provided in the touch sensor shown in FIG. 1.

In the touch sensor 1, if necessary, a passivation (PAS) layer 10 can be formed on one side or both sides (see FIG. 21). The PAS layer 10 is the layer arranged on the surface, which exposes the first electrodes 3 and the first lead wirings X of the touch sensor 1, or the surface, which exposes the second electrodes 4 and the second lead wirings Y. By arranging the PAS layer 10 on the surface which exposes the electrodes of the touch sensor 1, the aforementioned circuits are protected from the physical damage or the chemical damage. That is, this improves the damage resistance or the chemical resistance of the surfaces of the touch sensor 1.

The thickness of the PAS layer 10 is preferably in a range of 1 μm to 20 μm. When the thickness of the PAS layer 10 is less than 1 μm, it is too thin, so that the aforementioned functions cannot be sufficiently demonstrated. In contrary, when the thickness of the PAS layer 10 is more than 20 μm, the PAS layer 10 does not dry quickly, so that it is not preferable from the point of view of the production efficiency.

Examples of the PAS layer 10 include acryls such as polymethyl methacrylate, polyethyl methacrylate, ethyl polyacrylate, polybutyl acrylate, etc., homopolymer of methacryl monomer, and acrylic resins of copolymer including these monomers, and other than that, a melamine resin, an acrylic resin, a urethane resin, an epoxy resin, etc. can be used.

Concretely, one-liquid curable resin such as melamine, acrylic melamine, epoxy-melamine, alkyd, urethane, acryl, etc., and a resin mixing thereof, or two-liquid curable resin mixed with a curing agent such as isocyanate, etc., or ultraviolet curing resin, electron beam curing resin, etc. produced by monomer or prepolymer, etc. having ethylenically unsaturated bond such as polyester acrylate, polyester methacrylate, epoxy acrylate, epoxy methacrylate, urethane acrylate, urethane methacrylate, polyether acrylate, polyether methacrylate, polyol acrylate, melamine acrylate, melamine methacrylate, etc. can be used. When using the ultraviolet curing resin, photoinitiator is further added.

Next, the manufacturing method of the aforementioned touch sensor 1 will be described.

<Manufacturing Method of Touch Sensor>

The method for manufacturing the touch sensor 1 includes the following each process.

(a) Preparing the transparent substrate 2 in which the metal layer is formed on both sides.

(b) Patterning the metal layer on both sides at the same time by the photolithographic method, and forming the plurality of the first electrodes 3 made of the metal mesh on one side of the transparent substrate 2 and forming the first lead wirings X, which are electrically connected to the external part from each of the first electrodes 3, and forming the plurality of the second lead wirings Y, which are electrically connected to the external part, on the opposite side surface of the first electrodes 3 formed surface of the aforementioned transparent substrate 2.

(c) Providing a photosensitive conductive film (TCTF: Transparent Conductive Transfer Film) of a transfer mold, in which the photosensitive resin layer including the conductive nanowires on a surface layer opposite side of the supporting film is formed, on the supporting film, and laminating this film on the surface of the transparent substrate 2, on which the second lead wirings Y are formed, and exposing from its upper side through a pattern mask, and patterning the conductive nanowires by developing after pealing the supporting film, and forming the plurality of the second electrodes 4, which connects to each of the second lead wirings Y.

(d) If necessary, forming the PAS layer on both sides.

Figure 4:
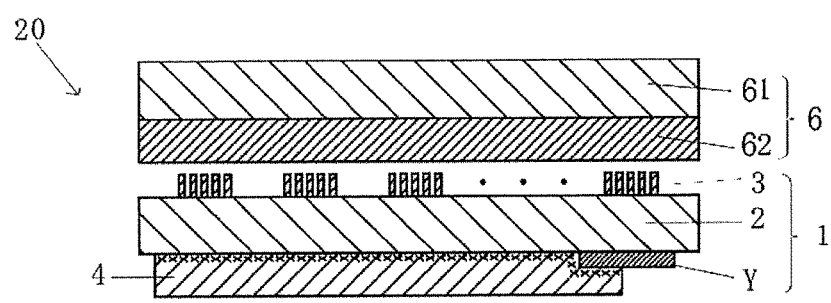
FIG. 4 is a cross-sectional view showing the touch sensor with a circularly polarizing plate, which includes the touch sensor of FIG. 1.
Figure 5:
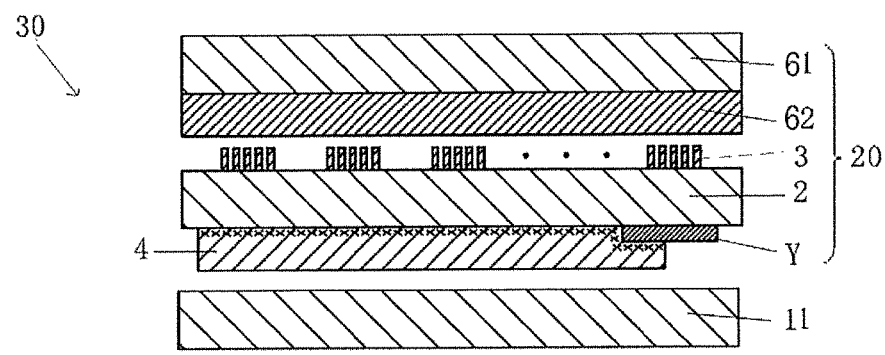
FIG. 5 is a cross-sectional view showing an image display device provided with the touch sensor with a circularly polarizing plate of FIG. 4.

2. Circularly polarizing plate, touch sensor provided with a circularly polarizing plate, and image display device Next, the circularly polarizing plate 6 and the touch sensor 20 (one with a circularly polarizing plate) will be described with reference to, mainly, FIGS. 4 and 5. FIG. 4 is a cross-sectional view showing the touch sensor 20 (one with a circularly polarizing plate), which includes the touch sensor 1 of embodiment 1. FIG. 5 is a cross-sectional view showing an image display device provided with the touch sensor with a circularly polarizing plate of FIG. 4.

The circularly polarizing plate 6 prevents incident external-light, which enters inside the image display device 30 from the display surface, from reflecting in the touch sensor 1 and emitting again from the image display device 30 through the display surface. When the incident external-light inside the image display device 30 emits from the display surface with image light from the display panel 11, the contrast of the image displayed in the display surface is deteriorated. The circularly polarizing plate 6 absorbs the external-light which is reflected from the touch sensor 1 and directs to the display surface, and it has a function of preventing the deterioration of contrast.

Concretely, the circularly polarizing plate 6 has a linearly polarizing plate 61 and a phase difference film 62 arranged in the touch sensor 1 side of the linearly polarizing plate 61. The linearly polarizing plate 61 has functions of decomposing the transmitted light into two polarization elements orthogonal to each other, transmitting the polarization element in one of the directions (direction parallel to transmitting axis), and absorbing the polarization element in the other direction (direction parallel to absorption axis) which is orthogonal to the aforementioned one of the directions. The phase difference film 62 functions as a quarter-wavelength plate which applies phase of quarter wavelength to the transmitted light. The incident external-light to the image display device 30 is converted to one of the linear polarization lights by transmitting through the linearly polarizing plate 21 of the circularly polarizing plate 6. Next, the external-light by the linear polarization light is converted to any of right circular polarization light or left circular polarization light by the phase difference film 62. When the external-light by the circular polarization light is reflected in the touch sensor 1, its turning direction is reversed. This reflecting light is converted to the other linear polarization light by the phase difference film 62, and next, it is absorbed in the linearly polarizing plate 61.

The linearly polarizing plate 61 is manufactured by absorbing and orienting the iodized compound molecule to the film material by polyvinyl alcohol (PVA). The film material by polyvinyl alcohol (PVA) is joined to another constituent element which provides the image display device 30, alternatively, another constituent element which provides the image display device 30 formed on a saponification processed surface of a material constituted by a transparent film such as triacetylcellulose (TAC), etc. through a joint layer.

As long as the effect of the present invention is obtained, the phase difference film 62 may be formed by any appropriate materials. A typical example is a stretched film of a polymer film. Examples of the resins forming the polymer film include polycarbonate-based resin having fluorene skeleton (described in e.g., Japanese Patent Application Publication No. 2002-48919), cellulose-based resin (described in e.g., Japanese Patent Application Publication No. 2003-315538, Japanese Patent Application Publication No. 2000-137116), etc. Further, examples of the phase difference film include a stretched film of a polymer material which includes equal to or more than 2 types of aromatic polyester polymers having different wavelength dispersion characteristics (e.g., Japanese Patent Application Publication No. 2002-14234), a stretched film of a polymer material which includes copolymer having equal to or more than 2 types of monomer units originating monomer which forms the polymers having different wavelength dispersion characteristics (described in International Patent Application Publication No. WO00/26705), a composite film in which equal to or more than 2 types of the stretched films having different wavelength dispersion characteristics are laminated (described in Japanese Patent Application Publication No. H02-120804).

The display panel 11 can be a liquid crystal display panel (LCD: Liquid Crystal Display) or an organic EL (OLED: Organic light-Emitting Diode) display. The LCD or the OLED has a plurality of pixels arranged in a matrix, and the display can be performed by switching ON and OFF the driving in each pixel by controlling a switching element such as Thin Film Transistor (TFT), etc.

In the arrangement relationship between the circularly polarizing plate 6 and the touch sensor 1, it is particularly preferable that the first electrodes 3, made of the metal mesh, are positioned closer to the circularly polarizing plate 6 side than the second electrodes 4.

When the two layers having the electrode patterns made of the metal nanowires are provided as the conventional technology (Patent Application Publication JP-A-2014-197183), the intensive scattering reflection of the external light occurring by the network structure, in which the metal nanowires are formed in contact, demonstrates synergistic effect by providing the two layers having the electrode patterns in the lamination arrangement, and therefore, the projection of partial visible light cannot be suppressed by only the circularly polarizing plate. As a result, the patterns are visible with yellowish color.

On the other hand, when the first electrodes 3, made of the metal mesh, are positioned closer to the circularly polarizing plate 6 side than the second electrodes 4 as described above, the scattering light generated in the second electrodes 4, which include the conductive nanowires, to the circularly polarizing plate 6 side is reflected by the first electrodes 3 and returned to the second electrodes 4 side, so that the scattering light from the touch sensor 1 can be suppressed.

Embodiment 2

Figure 6:
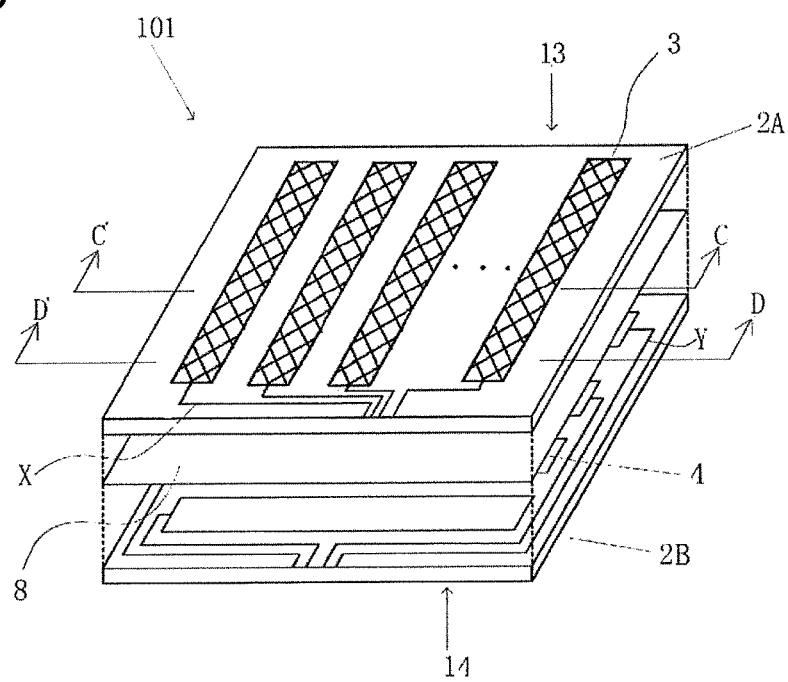
FIG. 6 is a disassembled perspective view showing a different example of the touch sensor in the touch sensor with a circularly polarizing plate according to embodiment 2.
Figure 7:
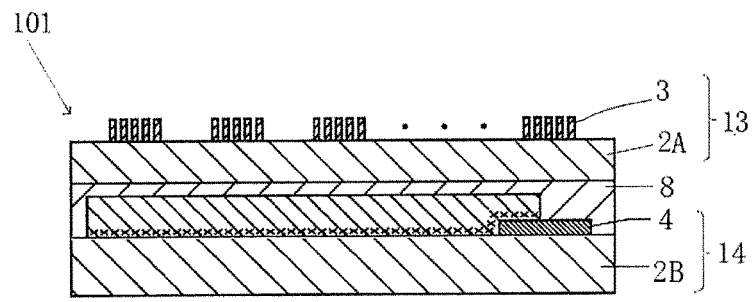
FIG. 7 is a C-C' line cross-sectional enlarged view showing the touch sensor of FIG. 6.
Figure 8:
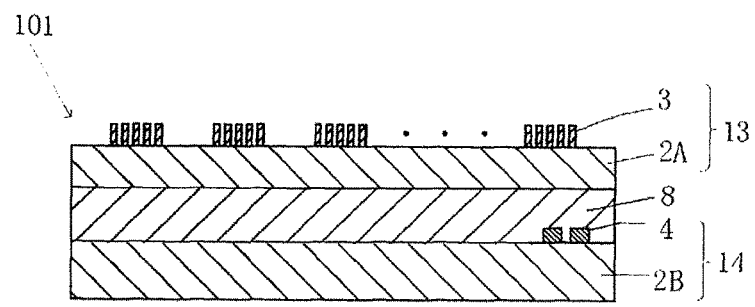
FIG. 8 is a D-D' line cross-sectional enlarged view of the touch sensor of FIG. 6.

FIG. 6 is a disassembled perspective view showing different example of a touch sensor in a touch sensor with a circularly polarizing plate according to embodiment 2. FIG. 7 is a C-C' line cross-sectional enlarged view showing the touch sensor of FIG. 6. FIG. 8 is a D-D' line cross-sectional enlarged view of the touch sensor of FIG. 6. The C-C' cross-section is the cross-sectional view when the touch sensor 1 is cut in the second electrode 4. The D-D' cross-section is the cross-sectional view when the touch sensor 1 is cut in a space between the second electrodes 4.

As shown in FIGS. 6, 7 and 8, the touch sensor 101 in the touch sensor 201 (one with a circularly polarizing plate) of embodiment 2 includes the first transparent substrate 2A, a plurality of the first electrodes 3 independently formed in a stripe shape on the first transparent substrate 2A, first lead wirings X electrically connected from the first electrodes 3 to an external part, a second transparent substrate 2B arranged to face to the first transparent substrate 2A, a plurality of the second electrodes 4 formed in a stripe shape in a manner of intersecting with the first electrodes 3 on the second transparent substrate 2B, second lead wirings Y electrically connected from the second electrodes 4 to the external part, and an adhesive layer 8 adhering the first conductive sheet 13, which includes the first electrodes 3, and the second conductive sheet 14, which includes the second electrodes 4.

Further, as shown in FIGS. 6, 7, and 8, the touch sensor 101 of embodiment 2 differs from embodiment 1 in the following points that two transparent substrates of the first transparent substrate 2A and the second transparent substrate 2B are used, in which the first electrodes 3 are formed in the opposite side of the second transparent substrate 2B on the first transparent substrate 2A, and the adhesive layer 8 is formed in the second transparent substrate 2B side, and in which the second electrodes 4 are formed in the first transparent substrate 2A side of the second transparent substrate 2B.

Hereinafter, only the aforementioned different points in each of the parts constituting the touch sensor 101 will be described.

<First Transparent Substrate and Second Transparent Substrate>

The materials of the first transparent substrate 2A and the second transparent substrate 2B are the same as the transparent substrate 2 of embodiment 1.

<Adhesive Layer>

The adhesive layer 8 is the layer to adhere the first conductive sheet 13 and the second conductive sheet 14. A heat sensitive resin or a pressure sensitive resin which appropriates to a type of the first transparent substrate 2A and the second transparent substrate 2B is used as a material for the adhesive layer 8. Concretely, the resins such as a PMMA based resin, PC, polystyrene, a PA based resin, a poval based resin, a silicone based resin, etc. are used. The adhesive layer 8 is formed on the first transparent substrate or the second transparent substrate by a gravure coating method, a roll coating method, a comma coating method, a gravure printing method, a screen printing method, an offset printing method, etc.

A double-sided adhesive sheet produced by the aforementioned resins can be used instead of the adhesive layer 8 formed between the first conductive sheet 13 and the second conductive sheet 14.

Next, the manufacturing method of the touch sensor 101 according to embodiment 2 will be described.

<Manufacturing Method of Touch Sensor>

A method for manufacturing the touch sensor includes the following each process.

(a) Preparing the first transparent substrate 2A in which a metal layer is formed on one side thereof.

(b) Patterning the metal layer by a photolithographic method, and forming a plurality of the first electrodes 3 made of the metal mesh and the first lead wirings X, which are electrically connected from each of the first electrodes 3 to the external part, on one side of the first transparent substrate 2A, and obtaining the first conductive sheet 13.

(c) Forming a PAS layer on the electrode forming surface of the first conductive sheet 13, if necessary.

(d) Preparing the second transparent substrate 2B on which the metal layer is formed on one side thereof.

(e) Patterning the metal layer by the photolithographic method, and forming the second lead wirings Y, which are electronically connected to the external part, on one side of the aforementioned second transparent substrate 2B.

(f) Providing a photosensitive conductive film (TCTF: Transparent Conductive Transfer Film) of a transfer mold, in which the photosensitive resin layer including the conductive nanowires on a surface layer opposite side of the supporting film is formed, on the supporting film, and laminating this film on the surface of the transparent substrate 2, on which the second lead wirings Y are formed, and exposing light from its upper side through a pattern mask, and patterning the conductive nanowires by developing after pealing the supporting film, and forming the plurality of the second electrodes 4 which connect to each of the second lead wirings Y, and obtaining the second conductive sheet 14.

(g) Adhering the first conductive sheet 13 and the second conductive sheet 14 in a manner in which the electrode forming surface of these sheets directs in the same direction.

Figure 9:
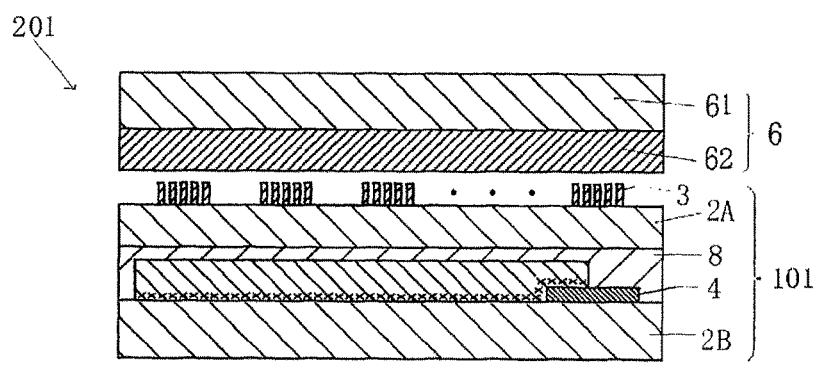
FIG. 9 is a cross-sectional view of the touch sensor (one provided with a circularly polarizing plate) including the touch sensor of FIG. 6.
Figure 10:
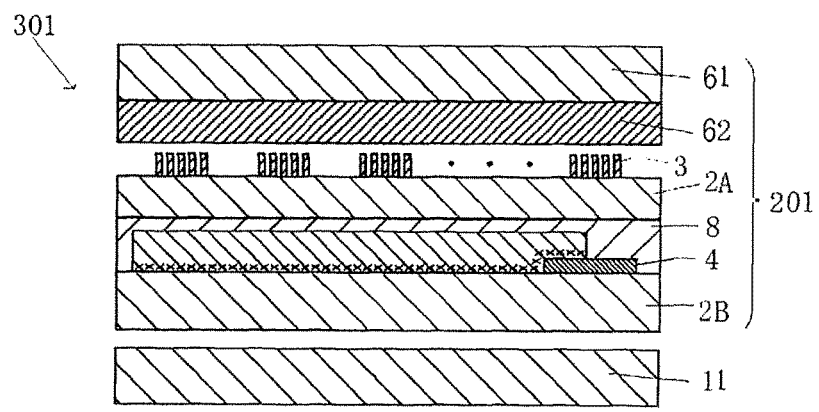
FIG. 10 is a cross-sectional view of an image display device provided with the touch sensor with a circularly polarizing plate of FIG. 9.

2. Circularly polarizing plate, touch sensor provided with a circularly polarizing plate, and an image display device FIG. 9 is a cross-sectional view of the touch sensor (one provided with a circularly polarizing plate) including the touch sensor of FIG. 6. FIG. 10 is a cross-sectional view of an image display device provided with the touch sensor with a circularly polarizing plate of FIG. 9. The basic structure of embodiment 2 is the same as embodiment 1 except the structure of the touch sensor, so that the description for the structure other than the touch sensor 101 is omitted.

Embodiment 3

1. Structure of Touch Sensor

Figure 11:
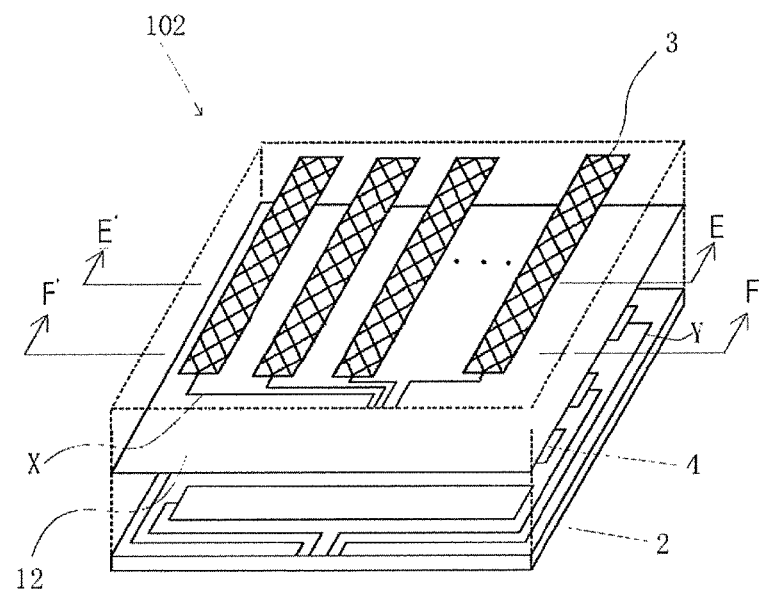
FIG. 11 is a disassembled perspective view showing a different example of a touch sensor in a touch sensor provided with a circularly polarizing plate according to embodiment 3.
Figure 12:
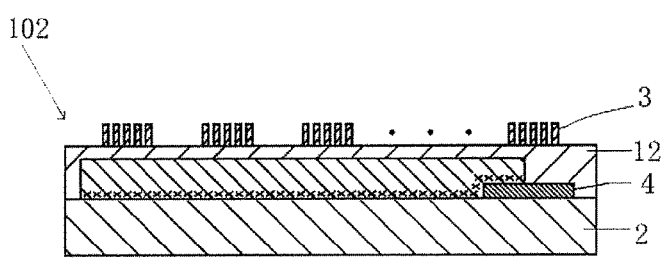
FIG. 12 is an E-E' line cross-sectional enlarged view of the touch sensor of FIG. 11.
Figure 13:
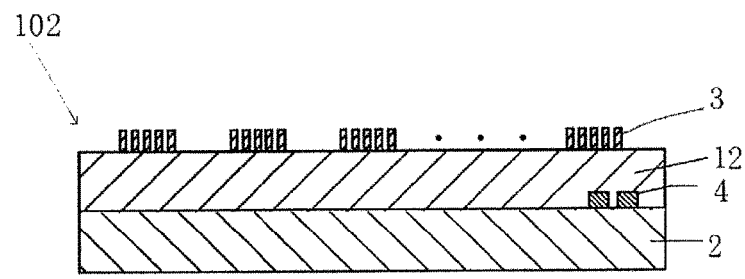
FIG. 13 is an F-F' line cross-sectional enlarged view of the touch sensor of FIG. 11.

FIG. 11 is a disassembled perspective view showing different example of a touch sensor in a touch sensor provided with a circularly polarizing plate according to embodiment 3. FIG. 12 is an E-E' line cross-sectional enlarged view of the touch sensor of FIG. 11. FIG. 13 is a F-F' line cross-sectional enlarged view of the touch sensor of FIG. 11. The E-E' cross-section is the cross-sectional view when the touch sensor 102 is cut in the second electrode 4. The F-F' cross-section is the cross-sectional view when the touch sensor 102 is cut in a space between the second electrodes 4.

As shown in FIGS. 11, 12, and 13, the touch sensor 102 in the touch sensor 202 (one with a circularly polarizing plate) of embodiment 3 includes a transparent substrate 2, a plurality of the first electrodes 3 independently formed in a strip shape on the transparent substrate 2, first lead wirings X electrically connected from the first electrode 3 to the external part, a plurality of the second electrodes 4 formed in a strip shape in a manner of intersecting with the first electrodes 3 on the transparent substrate 2, second lead wirings Y electrically connected from the second electrodes 4 to the external part, and an intermediate layer 12 provided between the first electrodes 3 and the second electrodes 4.

Further, as shown in FIGS. 11, 12, and 13, the touch sensor 102 of embediment 3 differs from embodiment 1 in the following points that the first electrodes 3 and the second electrodes 4 are formed on the same side of the transparent substrate 2, and in which the intermediate layer is provided between the first electrodes 3 and the second electrodes 4.

Hereinafter, only the aforementioned different points for each of the parts constituting the touch sensor 102 will be described.

<Intermediate Layer>

The intermediate layer 12 can be arranged on the transparent substrate 2. The intermediate layer 12 can be arranged on the first electrodes 3 and can support the second electrodes 4. Alternatively, the intermediate layer 12 can be arranged on the second electrodes 4 and can support the first electrodes 3. Further, the intermediate layer 12 can insulate the first electrodes 3 and the second electrodes 4 from each other.

Examples of the intermediate layer 12 include alkali metals such as LiF, KCl, CaF2, MgF2, etc., a halogen compound or a fused silica of alkaline earth metals, SiO2, SiNX, etc., InP, InSb, etc. as semiconductor series, an In compound which is used in, mainly, a transparent electrode such as ITO, IZO, etc. as transparent oxide used in a semiconductors or dielectric substances, or transparent oxides, etc. used in semiconductors or dielectric substances of ZnOx, ZnS, ZnSe, TiOx, WOx, MoOx, ReOx, as well as Alq3, NPB, TAPC, 2TNATA, CBP, Bphen, etc. as organic semiconductor series, silsesquioxane as reduced dielectric constant substance or its derivatives (hydrogen-silsesquioxane (H—SiO3/2)n, methylsilsesquioxane (CH3-SiO3/2)n), porous silica, porous zinc oxide (prous ZnOx) in which porous silica or fluorine or carbon atom is doped, a polymer compound (CYTOP) in which fluorine is substituted, or a compound mixing thereof.

Next, the manufacturing method of the touch sensor 102 according to embodiment 3 will be described.

<Manufacturing Method of Touch Sensor>

The method for manufacturing a touch sensor includes the following each process.

(a) Preparing the transparent substrate 2 in which the metal layer is formed on one side thereof.

(b) Patterning the metal layer by the photolithographic method, and forming a plurality of the first electrodes 3, made of the metal mesh on one side of the transparent substrate 2, and forming the first lead wirings X, which are electrically connected from each of the first electrodes 3 to the external part, and the second lead wirings Y, which are electrically connected to the external part.

(c) forming the intermediate layer 12 on the first electrodes 3 formed surface of the transparent substrate 2.

(d) Providing a photosensitive conductive film (TCTF: Transparent Conductive Transfer Film) of a transfer mold, in which the photosensitive resin layer including the conductive nanowires on a surface layer opposite side of the supporting film is formed, on the supporting film, and laminating this film on the surface of the transparent substrate 2, on which the intermediate layer 12 is formed, and exposing light from its upper side through a pattern mask, and patterning the conductive nanowires by developing after pealing the supporting film, and forming the plurality of the second electrodes 4, which connects to each of the second lead wirings Y.

Figure 14:
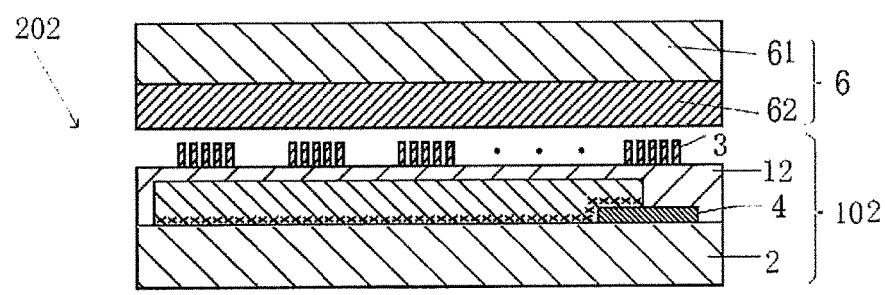
FIG. 14 is a cross-sectional view showing the touch sensor with a circularly polarizing plate, which includes the touch sensor of FIG. 11.
Figure 15:
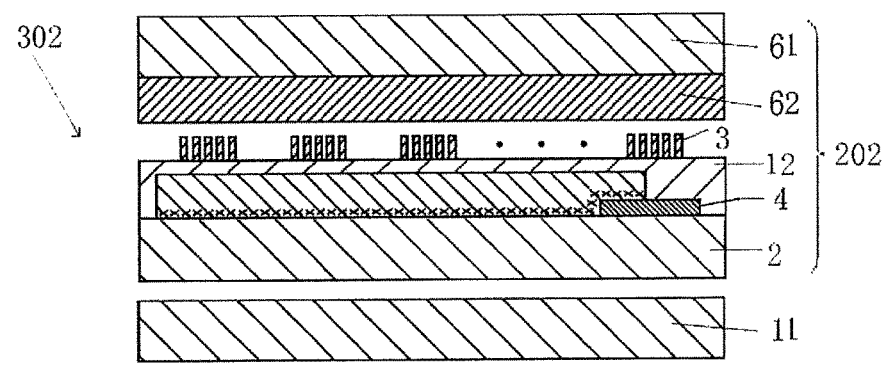
FIG. 15 is a cross-sectional view of an image display device including the touch sensor with a circularly polarizing plate of FIG. 14.

2. Circularly polarizing plate, touch sensor provided with a circularly polarizing plate, and image display device FIG. 14 is a cross-sectional view showing the touch sensor provided with a circularly polarizing plate which is provided with the touch sensor of FIG. 11. FIG. 15 is a cross-sectional view of an image display device including the touch sensor provided with a circularly polarizing plate of FIG. 14. The basic structure of embodiment 3 is the same as embodiment 1 except the structure of the touch sensor, so that the description for the structure other than the touch sensor 102 is omitted.

Embodiment 4

1. Structure of Touch Sensor

Figure 16:
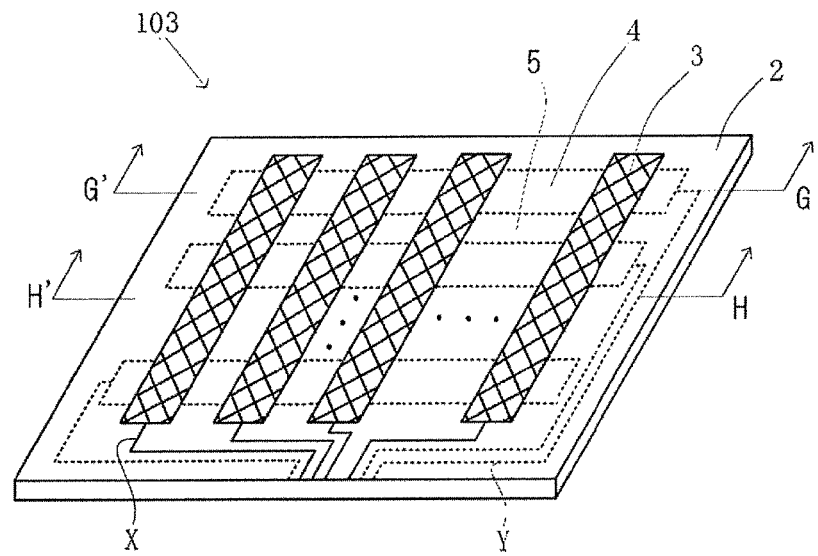
FIG. 16 is a disassembled perspective view showing a different example of the touch sensor in the touch sensor with a circularly polarizing plate according to embodiment 4.
Figure 17:
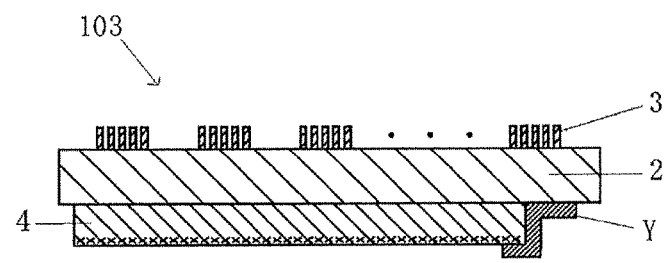
FIG. 17 is a G-G' line cross-sectional enlarged view of the touch sensor of FIG. 16.
Figure 18:
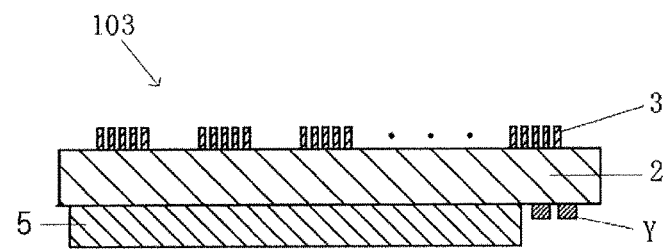
FIG. 18 is an H-H' line cross-sectional enlarged view showing the touch sensor of FIG. 16.

FIG. 16 is a disassembled perspective view showing a different example of a touch sensor in a touch sensor provided with a circularly polarizing plate according to embodiment 4. FIG. 17 is an G-G' line cross-sectional enlarged view of the touch sensor of FIG. 16. FIG. 18 is a H-H' line cross-sectional enlarged view showing the touch sensor of FIG. 16. The G-G' cross-section is the cross-sectional view when the touch sensor 1 is cut in the second electrode 4. The H-H' cross-section is the cross-sectional view when the touch sensor 1 is cut in a space between the second electrodes 4.

As shown in FIGS. 16, 17, and 18, the touch sensor 103 in the touch sensor 203 (one with a circularly polarizing plate) of embodiment 4 includes a transparent substrate 2, a plurality of the first electrodes 3 independently formed in a strip shape on the transparent substrate 2, first lead wirings X electrically connected from the first electrode 3 to the external part, a plurality of the second electrodes 4 formed in a strip shape in a manner of intersecting with the first electrodes 3 on the surface, which is opposite to the surface forming the first electrodes 3, of the transparent substrate 2, an insulation part 5 continuously formed with the second electrodes 4, and second lead wirings Y electrically connected from the second electrodes 4 to the external part.

Further, as shown in FIGS. 16, 17, and 18, the touch sensor 103 of embedment 4 differs from embodiment 1 in the following points that the insulation part 5 is continuously formed with the second electrodes 4 on a surface of the transparent substrate 2 on which the first electrodes 3 are formed, and in which the second electrodes 4 include the conductive nanowires on the surface which is opposite side from the transparent substrate 2 of the photocurable resin binder.

Hereinafter, only the aforementioned different points for each of the parts configuring the touch sensor 103 will be described.

<Insulation Part>

The insulation part 5 is provided by a binder resin which configures the second electrodes 4 including the conductive nanowires. Further, the thickness of the insulation part 5 is the same as or approximate to the thickness of the second electrodes 4.

When the insulation part 5 exists as described above, the visible patterns of the second electrodes 4 further hardly occur because the insulation part 5 is arranged in the region adjacent to the second electrodes 4, and the thickness of the insulation part is the same as or approximate to the second electrodes 4, and the material is the same. Therefore, the differences in the transparency and the refractive index between the second electrodes 4 and the insulation part 5 hardly occur.

The width of the insulation part 5 is preferably approximately 10 μm to 100 μm. The lower limit is set 10 μm because when the width of the insulation part is less than 10 μm, ion migration occurs when using, and a short circuit occurs between electrodes. On the other hand, the upper limit is set 100 μm because when the width exceeds 100 μm, the insulation part 5 is visibly recognized when illuminating by the light, or the sensitivity of the touch sensor 1 is deteriorated.

Next, the manufacturing method of the aforementioned touch sensor 103 will be described.

<Manufacturing Method of Touch Sensor>

The method for manufacturing a touch sensor 103 includes the following each process.

(a) Preparing the transparent substrate 2 in which the metal layer is formed on one side.

(b) Patterning the metal layer by the photolithographic method, and forming a plurality of the first electrodes 3, made of the metal mesh, on one side of the transparent substrate 2, and forming the first lead wirings X, which are electrically connected from each of the first electrodes 3 to the external part.

(c) Providing a photosensitive conductive film (TCTF: Transparent Conductive Transfer Film) of a transfer mold, in which the photosensitive resin layer including the conductive nanowires on a surface layer in the supporting film is formed, on the supporting film, and laminating this film on the surface which is opposite to the first electrodes 3 formed surface of the transparent substrate 2, and exposing light from its upper side through a pattern mask, and patterning the conductive nanowires by exposing/developing again after peeling the supporting film, and forming the second electrodes 4 and the insulation part 5 which continues to the second electrodes 4.

(d) Forming a plurality of the second lead wirings Y, which is electrically connected to the external part, on the first electrode 3 formed on the surface of the aforementioned transparent substrate 2 by printing method.

(e) Forming a PAS layer in both sides, if necessary.

In the aforementioned process (c) according to embodiment 4, the photosensitive conductive film (TCTF: Transparent Conductive Transfer Film) of the transfer mold, in which the photosensitive resin layer including the conductive nanowires on the surface in the support film side is formed on the support film, is used. When exposing again after peeling the aforementioned support film, in the part which was not cured by the first exposure, the surface of the photosensitive resin layer which is exposed to oxygen becomes inactive and it is not cured, so that the insulation part 5 is formed by removing the conductive nanowires by the development.

Other methods may be applied to form the insulation part 5. For example, after entirely forming the conductive layer including the conductive nanowires by using the printing method, the energy line, e.g., laser, is applied to a part of the conductive layer including the conductive nanowires, and the insulation part 5, in which a part of the conductive nanowires is removed, is formed. The insulation part 5 is formed by applying the energy line such as, e.g., carbon dioxide gas laser which is several tens of nanometers in a spot diameter, and pulverizing the conductive nanowires.

Figure 19:
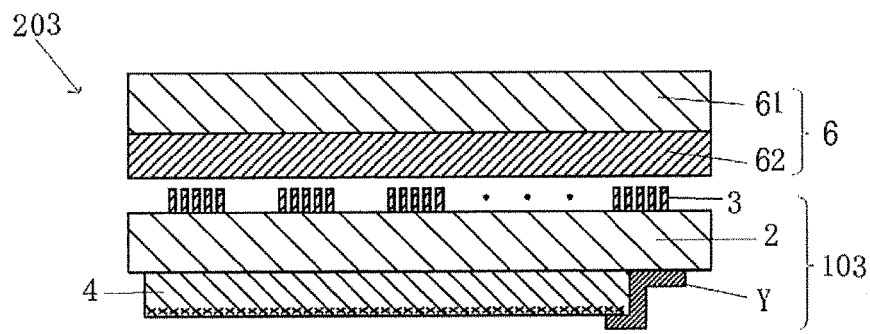
FIG. 19 is a cross-sectional view of the touch sensor with a circularly polarizing plate, which includes the touch sensor of FIG. 16.
Figure 20:
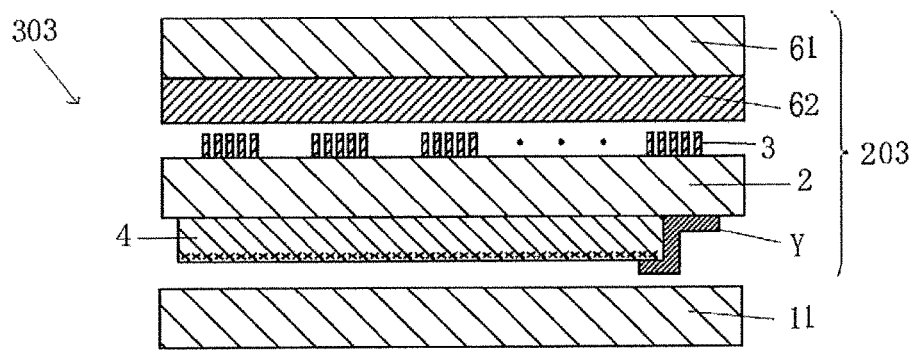
FIG. 20 is a cross-sectional view of an image display device which is provided with the touch sensor provided with a circularly polarizing plate of FIG. 19.

2. Circularly polarizing plate, touch sensor provided with a circularly polarizing plate, and an image display device FIG. 19 is a cross-sectional view of the touch sensor provided with a circularly polarizing plate, which includes the touch sensor of FIG. 16. FIG. 20 is a cross-sectional view of an image display device provided with the touch sensor with a circularly polarizing plate of FIG. 19. The basic structure of embodiment 4 is the same as embodiment 1 except the structure of the touch sensor, so that the description for the structure other than the touch sensor 103 is omitted.

The insulation part 5 described in embodiment 4 can be applied to embodiments 2 and 3.

Modified Examples

The touch sensor provided with a circularly polarizing plate according to the present invention is not limited to a flat plate, but it may be three-dimensional form.

Figure 22:
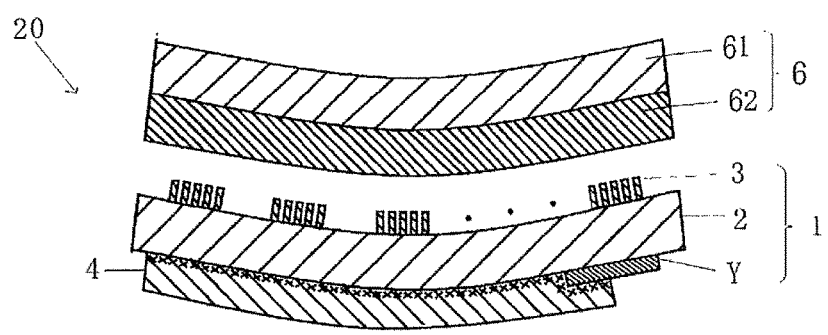
FIG. 22 is a cross-sectional view showing an example of the touch sensor provided with a circularly polarizing plate having a concave-shaped touch operation surface.
Figure 23:
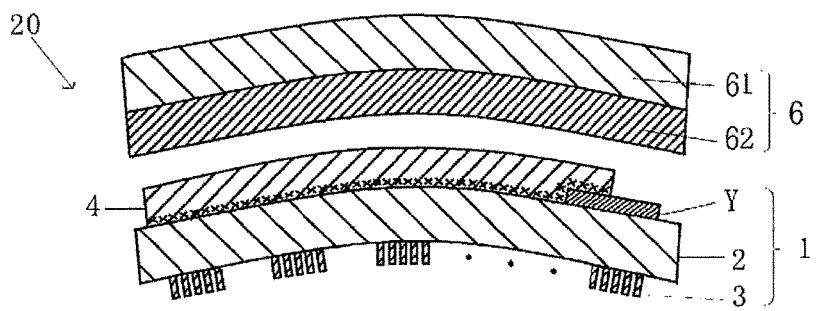
FIG. 23 is a cross-sectional view showing an example of the touch sensor provided with a circularly polarizing plate having a convex-shaped touch operation surface.

FIG. 22 is a cross-sectional view showing an example of the touch sensor provided with a circularly polarizing plate having a concave-shaped touch operation surface. FIG. 23 is a cross-sectional view showing an example of the touch sensor provided with a circularly polarizing plate having a convex-shaped touch operation surface.

In FIG. 22, regarding the touch sensor 20 (one with a circularly polarizing plate) according to embodiment 1, the first electrodes 3 made of the metal mesh are positioned closer to the circularly polarizing plate 6 side than the second electrodes 4, and all layers are curved in order to have the concave-shaped touch operation surface.

On the other hand, in FIG. 23, regarding the touch sensor 20 (one with a circularly polarizing plate) of embodiment 1, the second electrodes 4 are positioned closer to the circularly polarizing plate 6 side than the first electrodes 3 made of the metal mesh, and all layers are curved in order to have the convex-shaped touch operation surface.

The touch sensor 20 (one with a circularly polarizing plate) as shown in FIGS. 22 and 23 is the same as embodiment 1 except the points described above, so that the detailed description of each structure is omitted.

Any of the aforementioned examples includes the structure in which the first electrodes 3 made of the metal mesh are inwardly curved; that is, the surface side of the transparent substrate 2 in which the first electrodes 3 are provided is compressed, and the surface side of the transparent substrate 2 in which the second electrodes 4 are provided is stretched. With such a structure, it prevents the first electrodes 3 made of the metal mesh from being stretched, and as a result, the disconnection hardly occurs in the first electrodes 3 made of the metal mesh. The second electrodes 4, in which the conductive nanowires are stored in the binder resin, endures deformation, so that the problems do not occur even though it is outwardly curved. In the aforementioned concave shape or convex shape, it may be curved in a direction only parallel to the cross section as shown in FIGS. 22 and 23, or it may be curved in a direction parallel to and perpendicular to the cross section.

REFERENCE SIGNS LIST 1, 101, 102, 103 touch sensor
2 transparent substrate
2A first transparent substrate
2B second transparent substrate
3 first electrode
4 second electrode
5 insulation part
6 circularly polarizing plate
8 adhesive layer
10 PAS layer
11 display panel
12 intermediate layer
13 first conductive sheet
14 second conductive sheet
20, 201, 202, 203 touch sensor with a circularly polarizing plate
30, 301, 302, 303 image display device
X first lead wiring
Y second lead wiring

The invention claimed is:

1. A touch sensor with a circularly polarizing plate, the touch sensor comprising an electrostatic capacitance type touch sensor, and the circularly polarizing plate arranged on a visible side of the electrostatic capacitance type touch sensor, the electrostatic capacitance type touch sensor including:
a transparent substrate;
a plurality of first electrodes individually formed in a strip shape on the transparent substrate; and
a plurality of second electrodes formed on a surface of the transparent substrate opposite to a surface on which the first electrodes are formed, the second electrodes having a strip shape in a manner of intersecting with the first electrodes,
wherein the first electrodes are made of a metal mesh, the first electrodes made of metal fine wires in a lattice pattern,
the second electrodes are made of a plurality of conductive nanowires existing in a connecting state respectively so as to be conductively connected, and a binder resin holding the plurality of conductive nanowires on the transparent substrate, the second electrodes having a solid pattern, and
wherein a haze of the second electrodes is smaller than a haze of the first electrodes.

2. The touch sensor with the circularly polarizing plate according to claim 1, wherein the first electrodes, which are made of the metal mesh, are positioned closer to the circularly polarizing plate side than the second electrodes.

3. The touch sensor with the circularly polarizing plate according to claim 1, wherein the first electrodes, which are made of the metal mesh, are positioned closer to the circularly polarizing plate side than the second electrodes, and have a concave-shaped touch operation surface in which all layers are curved.

4. The touch sensor with the circularly polarizing plate according to claim 1, wherein the first electrodes, which are made of the metal mesh, are positioned closer to the circularly polarizing plate side than the second electrodes, and have a convex-shaped touch operation surface in which all layers are curved.

5. The touch sensor with the circularly polarizing plate according to claim 1, wherein the metal mesh is made of copper.

6. The touch sensor with the circularly polarizing plate according to claim 1, wherein a metal configuring the conductive nanowires is silver.

7. The touch sensor with the circularly polarizing plate according to claim 1, further comprising
an insulation part continuously forming with the second electrodes, wherein the insulation part is made of only the binder resin, which is provided in the second electrodes including the conductive nanowires.

8. The touch sensor with the circularly polarizing plate according to claim 1, further comprising
lead wirings, which are made of the same metal as the metal mesh and are connected with the first electrodes and the second electrodes,
wherein the conductive nanowires of the second electrodes exist in only a surface layer of the binder resin, and the surface layer overlaps with and directly connects to one end of the lead wirings.

9. An image display device comprising:
the touch sensor with the circularly polarizing plate according to claim 1, the touch sensor being provided on a front surface of a display panel.

10. The touch sensor with the circularly polarizing plate according to claim 1, wherein the thickness of each of the first electrodes and the second electrodes is set in a range of several tens of nanometers to several hundreds of nanometers.

11. The touch sensor with the circularly polarizing plate according to claim 1, wherein the conductive nanowires of the second electrodes exist in only a surface layer of the binder resin near the transparent substrate.

12. A touch sensor with a circularly polarizing plate, the touch sensor comprising an electrostatic capacitance type touch sensor, and the circularly polarizing plate arranged on a visible side of the electrostatic capacitance type touch sensor, the electrostatic capacitance type touch sensor including:
a first conductive sheet including a first transparent substrate, and a plurality of first electrodes individually formed in a strip shape on the first transparent substrate;
a second conductive sheet including a second transparent substrate arranged in a manner of facing the first transparent substrate, and a plurality of second electrodes formed in a strip shape in a manner of intersecting with the first electrodes on the second transparent substrate; and
an adhesive layer adhering the first conductive sheet and the second conductive sheet—with each other,
wherein the first electrode is made of the metal mesh, the first electrode is made of metal fine wires in a lattice pattern,
the second electrodes are made of a plurality of conductive nanowires, existing in a connecting state respectively so as to be conductively connected, and a binder resin holding the plurality of conductive nanowires on the second transparent substrate, the second electrodes having a solid pattern, and
wherein a haze of the second electrodes is smaller than a haze of the first electrodes.

13. The touch sensor with the circularly polarizing plate according to claim 12, wherein the first electrodes, which are made of the metal mesh, are positioned closer to the circularly polarizing plate side than the second electrodes.

14. The touch sensor with the circularly polarizing plate according to claim 12, wherein the metal mesh is made of copper.

15. The touch sensor with the circularly polarizing plate according to claim 12, wherein a metal configuring the conductive nanowires is silver.

16. The touch sensor with the circularly polarizing plate according to claim 12, further comprising
an insulation part continuously forming with the second electrodes,
wherein the insulation part is made of only the binder resin, which is provided in the second electrodes including the conductive nanowires.

17. A touch sensor with a circularly polarizing plate, the touch sensor comprising an electrostatic capacitance type touch sensor, and the circularly polarizing plate arranged on a visible side of the electrostatic capacitance type touch sensor, the electrostatic capacitance type touch sensor including:
a transparent substrate;
a plurality of first electrodes individually formed in a strip shape on the transparent substrate;
a plurality of second electrodes formed in a strip shape in a manner of intersecting with the first electrodes on the transparent substrate; and
an intermediate layer disposed between the first electrodes and the second electrodes,
wherein the first electrodes are made of a metal mesh, the first electrode is made of metal fine wires in a lattice pattern,
the second electrodes are made of a plurality of conductive nanowires, existing in a connecting state respectively so as to be conductively connected, and a binder resin holding the plurality of conductive nanowires on the transparent substrate, the second electrodes having a solid pattern, and
wherein a haze of the second electrodes is smaller than a haze of the first electrodes.

18. The touch sensor with the circularly polarizing plate according to claim 17, wherein the first electrodes, which are made of the metal mesh, are positioned closer to the circularly polarizing plate side than the second electrodes.

19. The touch sensor with the circularly polarizing plate according to claim 17, wherein the metal mesh is made of copper.

20. The touch sensor with the circularly polarizing plate according to claim 17, wherein a metal configuring the conductive nanowires is silver.

21. The touch sensor with the circularly polarizing plate according to claim 17, further comprising
an insulation part continuously forming with the second electrodes, wherein the insulation part is made of only the binder resin, which is provided in the second electrodes including the conductive nanowires.

* * * * *